(12) United States Patent
Bennett

(10) Patent No.: US 6,908,237 B2
(45) Date of Patent: Jun. 21, 2005

(54) X-RAY PROCESSOR AUTOMATIC FILM FEED

(76) Inventor: Gregory J. Bennett, 61 Cedar Swamp Rd., Jericho, NY (US) 11753

( * ) Notice: Subject to any disclaimer, the term of this patent is extended or adjusted under 35 U.S.C. 154(b) by 147 days.

(21) Appl. No.: 10/434,327

(22) Filed: May 8, 2003

(65) Prior Publication Data

US 2004/0005034 A1 Jan. 8, 2004

Related U.S. Application Data

(60) Provisional application No. 60/379,384, filed on May 9, 2002.

(51) Int. Cl.$^7$ ................................................ G03D 3/08
(52) U.S. Cl. ...................... 396/598; 396/612; 396/617; 396/620; 355/27; 378/173; 378/185
(58) Field of Search ................................ 396/567–570, 396/598, 599, 612, 617, 620, 626; 355/27–29, 72; 271/18; 378/173, 185

(56) References Cited

U.S. PATENT DOCUMENTS

| | | | |
|---|---|---|---|
| 3,720,408 A | * 3/1973 | Horn | ........................... 271/18 |
| 4,057,817 A | * 11/1977 | Korb et al. | ................... 396/568 |
| 4,324,478 A | * 4/1982 | Fukushima et al. | .......... 396/598 |
| 4,324,480 A | * 4/1982 | Nomura et al. | .............. 396/618 |
| 5,241,339 A | 8/1993 | Marany | |
| 5,398,093 A | 3/1995 | Carozzi | |
| 5,483,316 A | 1/1996 | Zwettler | |
| 5,678,117 A | 10/1997 | Alzer et al. | |

* cited by examiner

Primary Examiner—D. Rutledge
(74) Attorney, Agent, or Firm—Ostrager Chong Flaherty & Broitman P.C.

(57) ABSTRACT

An automatic x-ray film feed uses a timer and relay system to automatically develop a multiplicity of film slides one-by-one in an x-ray processor without requiring a user to manually advance the slides after each slides in developed. The timer activates a motor through a relay system and the film feed advances a single slide into the processor with a motor and roller assembly. After the film leaves the magazine, a trip switch is triggered, shutting off the motor and halting advancement of the next slide in the magazine. The timer than reactivates the motor based on a pre-selected interval set on the timer, facilitating movement of the next undeveloped film slide in the magazine.

20 Claims, 9 Drawing Sheets

X-RAY PROCESSOR AUTOMATIC FILM FEED

RELATED APPLICATION

This application claims priority from U.S. Provisional Application Ser. No. 60/379,384, filed May 9, 2002.

FIELD OF THE INVENTION

The present invention relates to an automatic film feed for use with an x-ray processor that holds a multiplicity of film slides and allows a user to develop the film slides one-by-one in an x-ray processor without manually advancing the slides after each slide develops. Specifically, the invention comprises a timer and relay system connected to a film feed housed within a enclosure, wherein the film feed advances film into the x-ray processor at certain set intervals that are pre-selected with the timer and relayed by the relay system.

BACKGROUND OF THE INVENTION

Typical practice in the medical and veterinary fields require the taking of x-rays and the subsequent development of the x-ray slides. The development of the x-ray slides can be achieved with any number of x-ray slide processors known in the prior art and sold on the open market. These x-ray processors have a single feed mechanism, wherein only one undeveloped x-ray slide can be fed into the x-ray processor at a time. After the x-ray film is processed, a procedure that varies but usually takes about 30 to 45 seconds, a user must manually advance the next undeveloped slide so that it feeds into the x-ray processor. However, manually advancing another undeveloped slide after each slide develops is a repetitive and time wasting procedure that prevents the user from tending to other tasks or responsibilities.

Therefore, it is an object of this invention to provide a film feed for an x-ray processor wherein a multiplicity of undeveloped film slides can be loaded into film feed that will automatically feed a new undeveloped slide into an x-ray processor after the previous slide is developed by the processor, thereby eliminating the requirement of manually advancing each individual slide into the processor and allowing the user to leave the processor unattended while all the slides develop.

It is a further object of this invention to provide an automatic film feed that is detachable from the x-ray processor and can work a multiplicity of x-ray processors of different styles and brands.

SUMMARY OF THE INVENTION

The present invention comprises a timer and relay system and more specifically a control panel connected to a film feed by a relay system, wherein the control panel discharges electrical impulses through the relay system at a pre-selected interval, causing the film feed to feed an undeveloped x-ray slide into an x-ray processor.

The film feed has a motor, a roller assembly and a magazine for holding a plurality of undeveloped film slides. Additional undeveloped film slides can be added to the magazine or existing slides can be removed as needed. As a result, the magazine functions as a reusable means for feeding slides into the processor. The magazine fits onto a frame that attaches to various x-ray processor types and brands externally such that it can be freely attached and detached.

The motor and roller assembly are interconnected such that the motor, when activated by the timer and relay system, causes the roller assembly to rotate in an axial direction. When rotating, the roller assembly frictionally forces a single, top slide in the magazine into the x-ray processor. When the single slide fully exits the magazine, a trip switch is triggered that de-activates the motor and stops the next slide in the magazine from advancing into the processor. The motor can be reactivated by the timer and relay system, thereby causing the next slide in the magazine to advance into the processor.

The control panel has an energy source, a direct current converter, a timer and a casing. The timer has a display that allows a user to select an interval from a range of interval times that corresponds to a length of time required to develop a film slide. When an interval registers on the timer, the timer activates the direct current converter, causing the converter to convert a voltage from the energy source into a lower voltage necessary to activate the film feed. The current is transmitted through the relay system into the film feed until negative feedback, resultant from when the trip switch is triggered by a film slide, causes the direct current converter to stop converting, at which point the direct current converter remains off until the next interval registers on the timer. The casing covers part or all of the energy source, converter and timer.

The control panel further contains an on/off switch and may contain an indicator light that indicates when the motor of the film feed is running, when the x-ray processor is developing a slide and/or when all slides are fully developed.

Other objects, embodiments, features and advantages of the present invention will be apparent when the description of a preferred embodiment of the invention is considered in conjunction with the annexed drawings, which should be construed in an illustrative and not limiting sense.

BRIEF DESCRIPTION OF THE FIGURES/DRAWINGS

DETAILED DESCRIPTION

Figure 1:
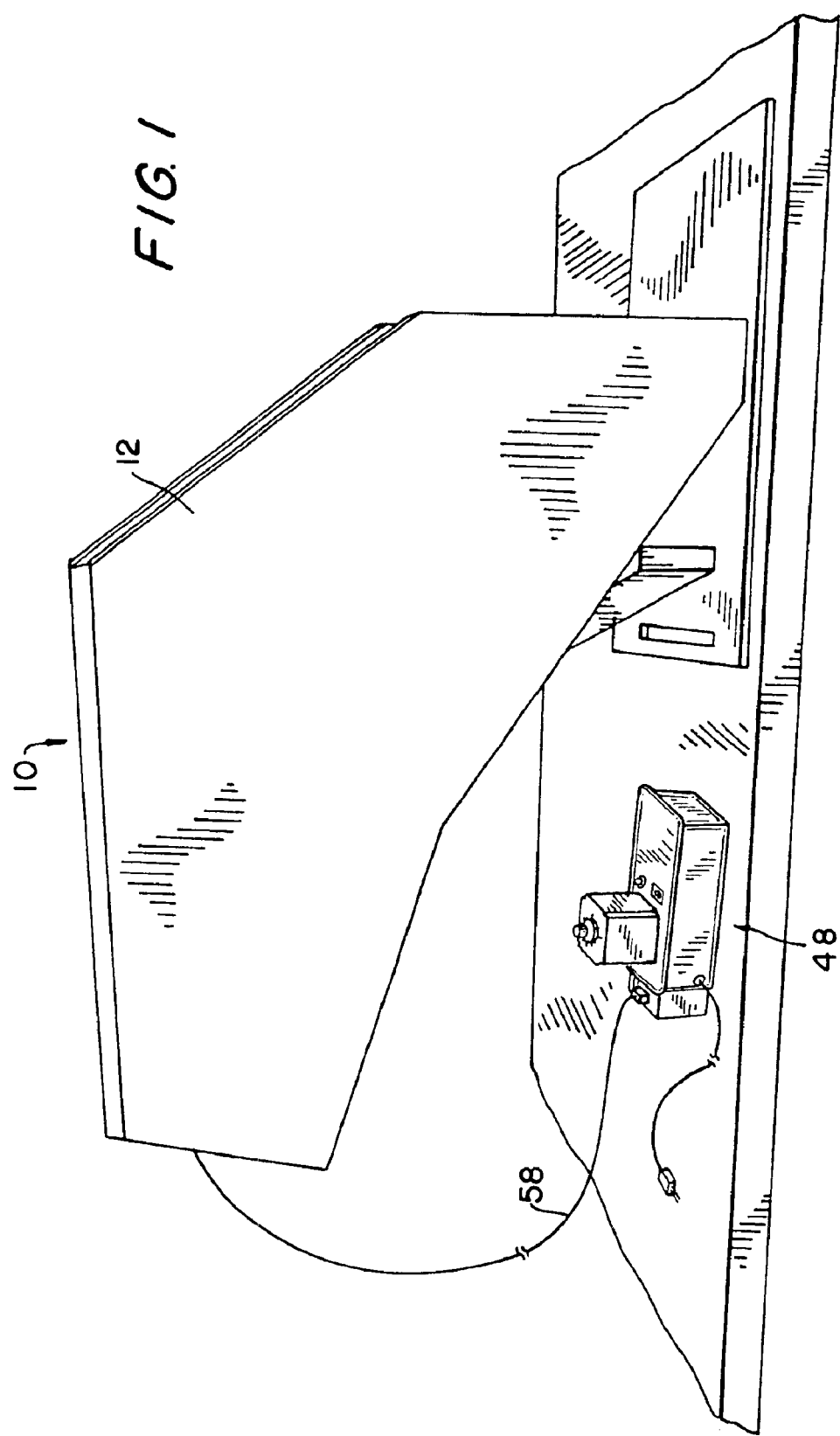
FIG. 1 is a perspective view of the automatic film feed, including the control panel, the relay system, and the enclosure.
Figure 11:
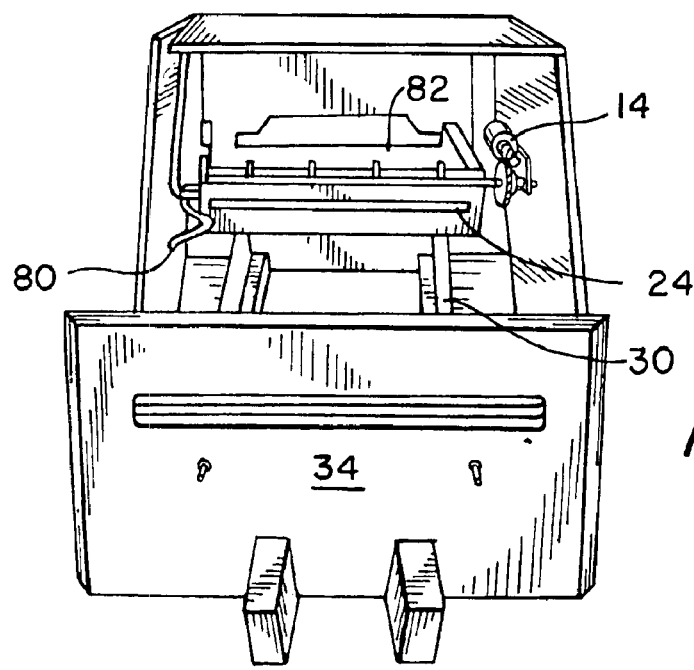
FIG. 11 is a front perspective view of the film feed with the enclosure opened.

An automatic film feed 10 is shown in FIGS. 1 and 11, having a relay system 46 a control panel 48, and an enclosure 12, wherein the enclosure filly encases a motor 14, a roller assembly 24, a trip switch 80, a magazine 82 that can hold a multiplicity of undeveloped film slides, and a framework 30 that detachably connects to an x-ray processor.

Figure 2:
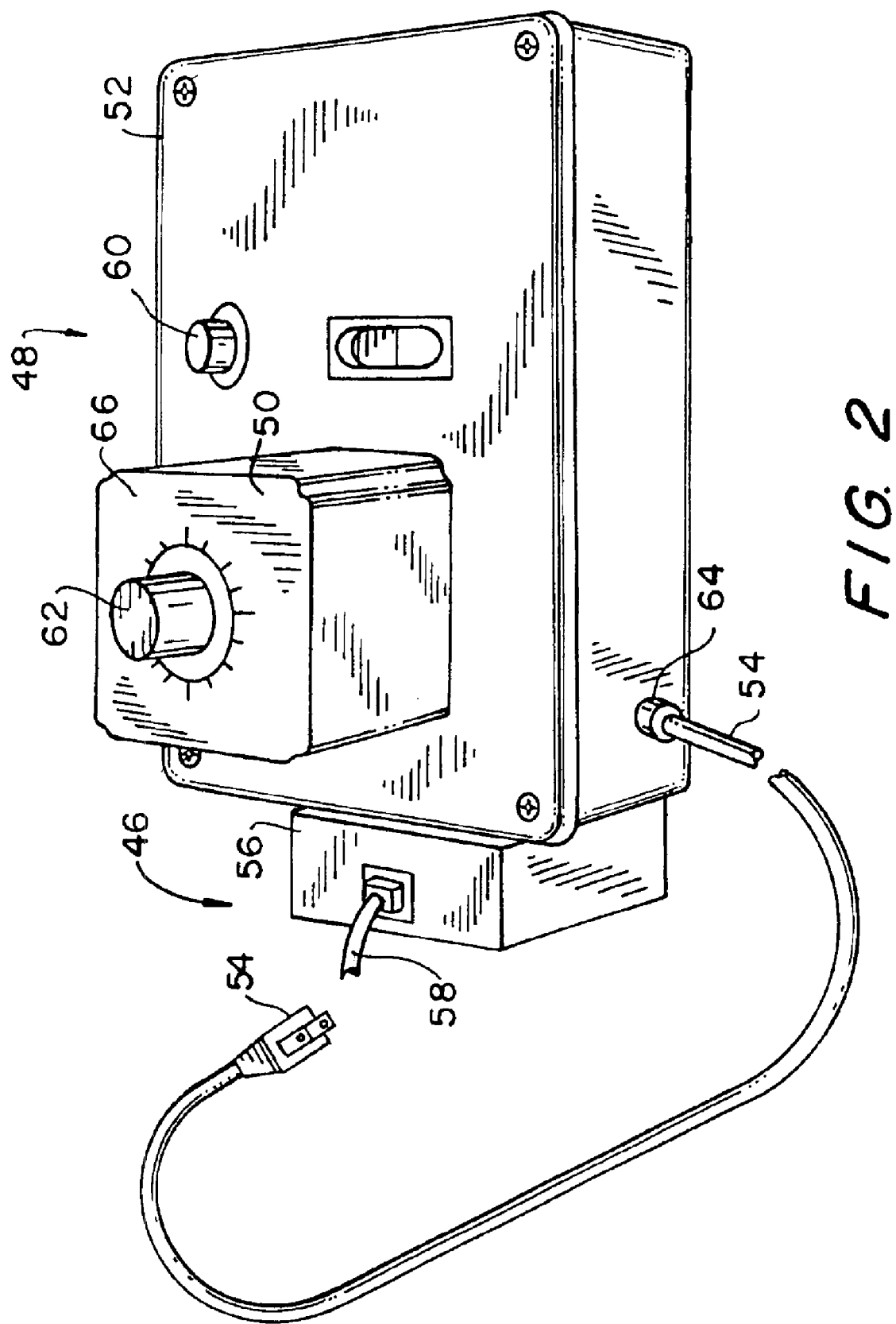
FIG. 2 is a perspective view of the control panel and the relay system
Figure 3:
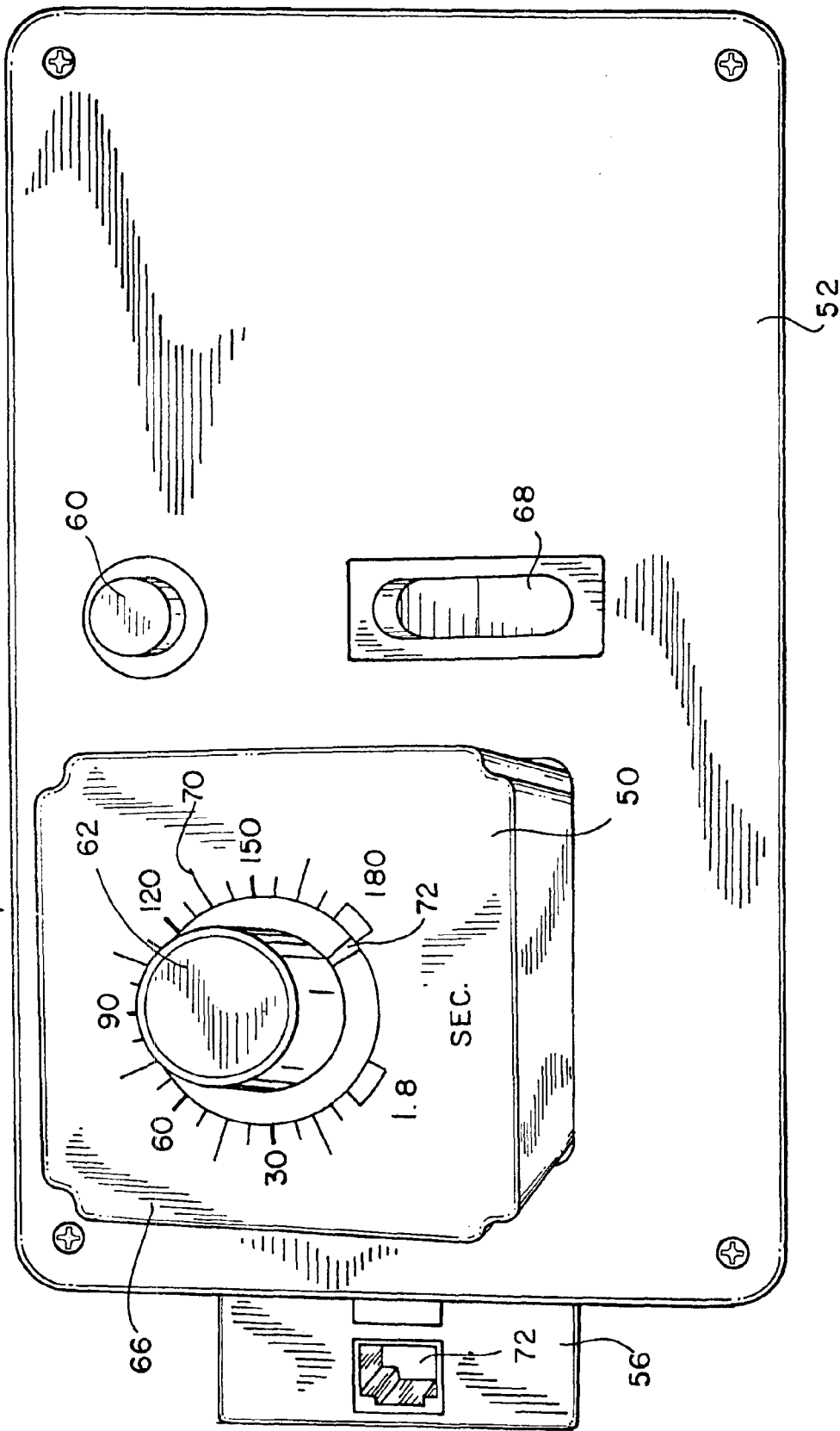
FIG. 3 is a top view of the control panel.

One embodiment of control panel 48 enclosed in a casing is shown in FIGS. 2 and 3, wherein the control panel has a direct current converter operably connected to a timer, a power source and a relay system. Timer 50 is partially enclosed by the casing 52, such that at least one operable segment of the timer is visible from outside of the casing. For example, in the present embodiment, the timer is positioned such that a large portion of the timer is visible above the casing. However, in other embodiments, the timer could be embedded within the casing, such that only a flat, operable segment of the timer is visible, such as with a digital display.

As shown in FIGS. 2 and 3, timer 50 contains dial 62 extending outwardly from an upper face 66 of the timer, wherein the timer has marker 72 on one portion of the dial. The upper face further includes interval markings 70 that surround the dial and correspond to a range of interval times. A user can select an interval time by moving the dial in a circular motion such that the marker points to a desired interval marking. An artisan would understand, however, that a wide variety of timers and upper faces could be effectively used with the present invention. For example, the timer could be largely electronic with a digital display on the upper face of the timer.

A power source is provided with the control panel. In one embodiment, the power source is an electrical cord 54 that can plug into a standard electrical outlet, such as a 120-volt outlet. Cord 54 penetrates the casing though a hole 64, and operably connects to a direct current converter inside the casing. The direct current converter has the ability to convert the voltage of the power source into a voltage suitable for activating motor 14 (see FIG. 4), and can transmit this voltage through the relay system. In the present embodiment, the converter converts the voltage from the power source into 12 volts of direct current. However, the converter only transmits this current through the connected relay system when activated by the timer. The exact amount of voltage and the source of power can vary widely within the spirit of the invention.

The direct current converter is activated when a selected interval registers on the timer. The converter converts the voltage from the energy source into the direct current necessary to activate the motor. The current transmits through the relay system into the motor until negative feedback deactivates the direct current converter. Once deactivated the converter stops converting. However, when enough seconds have passed so that the next interval registers on the timer, the converter is reactivated and current is once again transmitted through the relay system.

As seen in FIG. 3, the control panel also contains an on/off switch 68 and may further contain an indicator light 60. The indicator light can indicate when the motor of the film feed is running, when the x-ray processor is developing the slide and/or when all slides have been fully developed.

Relay system 46 is operably connected to control panel 48 and motor 14 such that electrical transmissions coming from the control panel are transmitted through the relay system into the motor. In the present embodiment, the relay system comprises a standard phone jack 56 adjacent to casing 52, wherein the phone jack has a receiving area 72 for a standard phone cord. Standard phone cord 58 connects into the receiving area of the phone jack and extends outwardly from the phone jack. The relay passes though a secured hole in enclosure 12 and operably connects to the motor. In other embodiments, the relay system can be any other type of device that can relay an electrical impulse from one location to another, such as, for example, an electrical cord.

Figure 4:
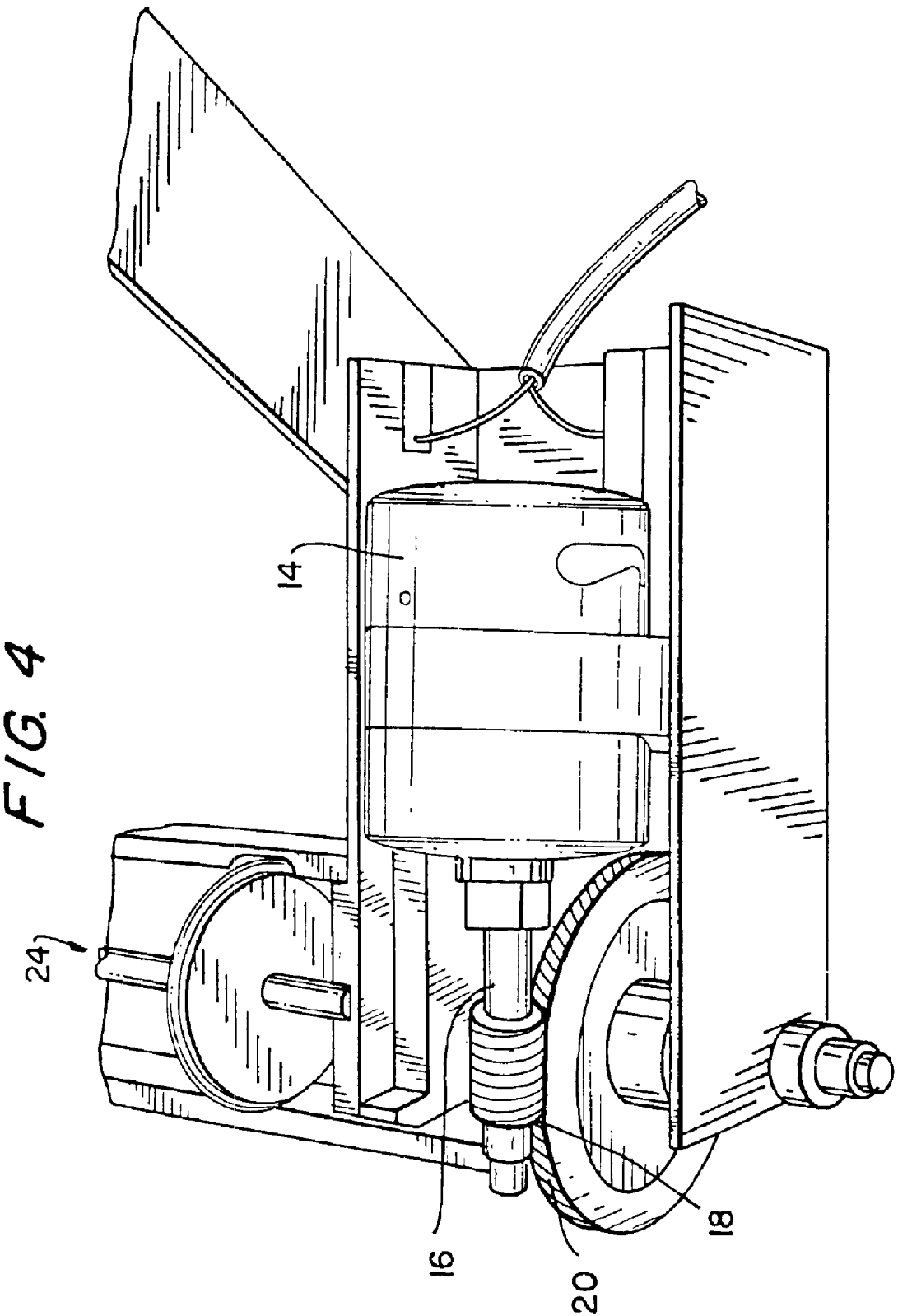
FIG. 4 is a first perspective view of the motor connected to the relay system and engaged to the roller assembly.
Figure 5:
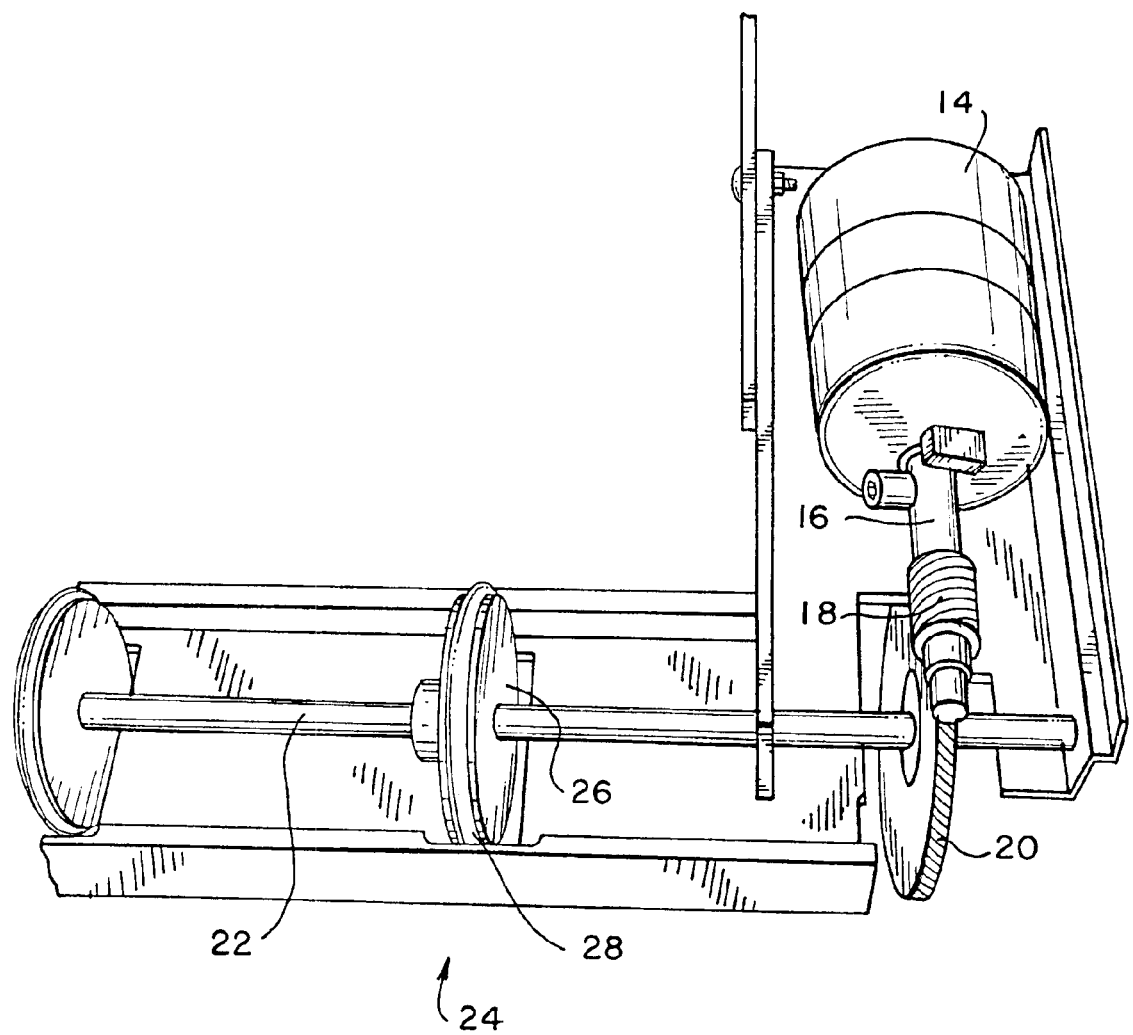
FIG. 5 is a second perspective view of the motor connected to the relay system and engaged to the roller assembly.

As seen in FIGS. 4 and 5, the relay system connects to motor 14, providing the motor with the necessary voltage for activation. Motor 14 is a standard mechanism with the ability to facilitate turning shaft 16 in an axial direction, and as such can be any typical motor known in the prior art. The motor spins shaft 16 in an axial motion about the central axis of the shaft. Corkscrew assembly 18, integrally connected to shaft 16, likewise spins in a circular motion, thereupon engaging roller assembly 24.

Figure 6:
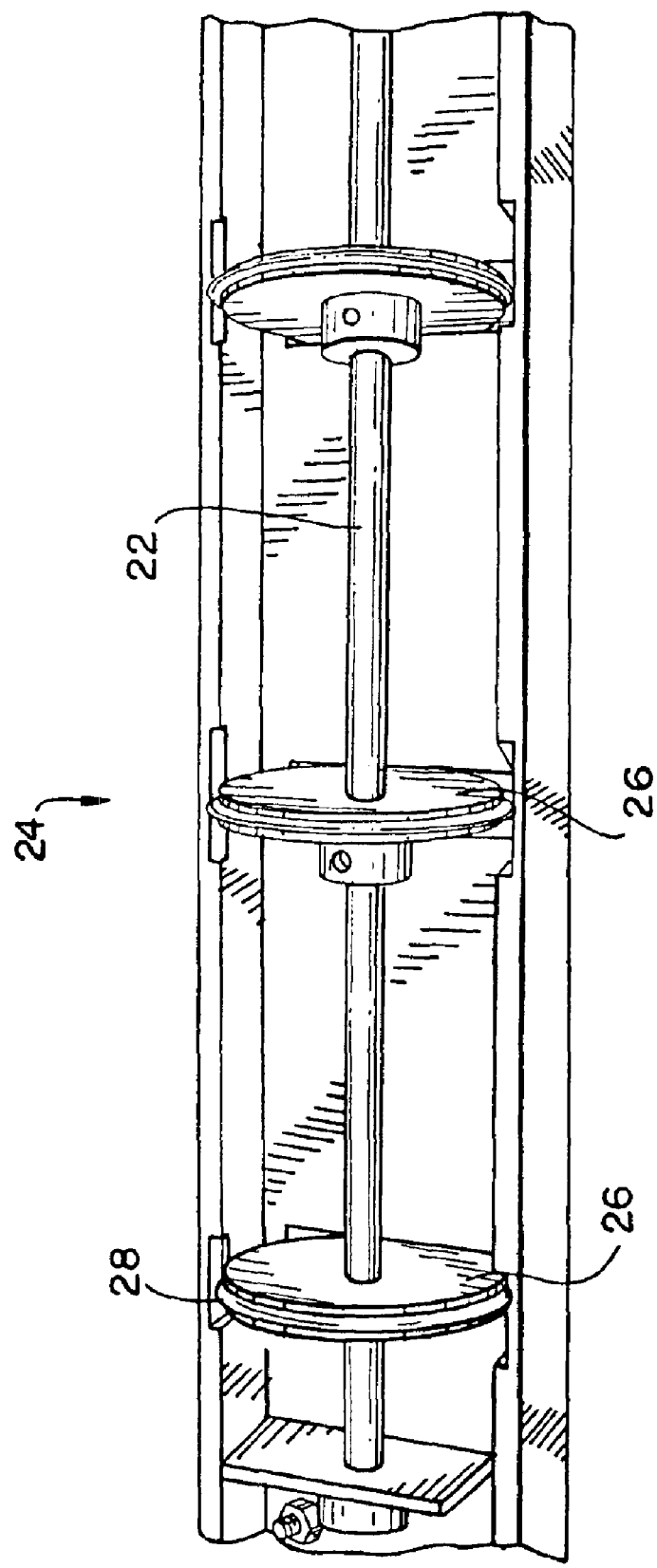
FIG. 6 is a top view of the roller assembly.

Roller assembly 24, as shown in FIGS. 5 and 6, rotates and advances the undeveloped film slides from the magazine into the x-ray processor. The corkscrew assembly 18 engages gear roller 20 on the roller assembly, such that when the corkscrew assembly rotates, the gear roller rotates in an axial direction perpendicular to the corkscrew. The gear roller is operably attached to axle 22, such that the spinning motion of the gear roller 20 causes axle 22 to spin at the same speed and in the same axial direction as the gear roller. Further, a plurality of roller wheels 26 are operably attached to axle 22, such that roller wheels 26 spin at the same speed and in the same direction as the axle and the gear roller. Each roller wheel 22 has a rubber sheath 28 surrounding the outer circumference of the wheel. The rubber sheaths contact the undeveloped slides held in the magazine in a non-destructive manner, and when rotating, facilitate movement of the slides into the x-ray processor.

Figure 7:
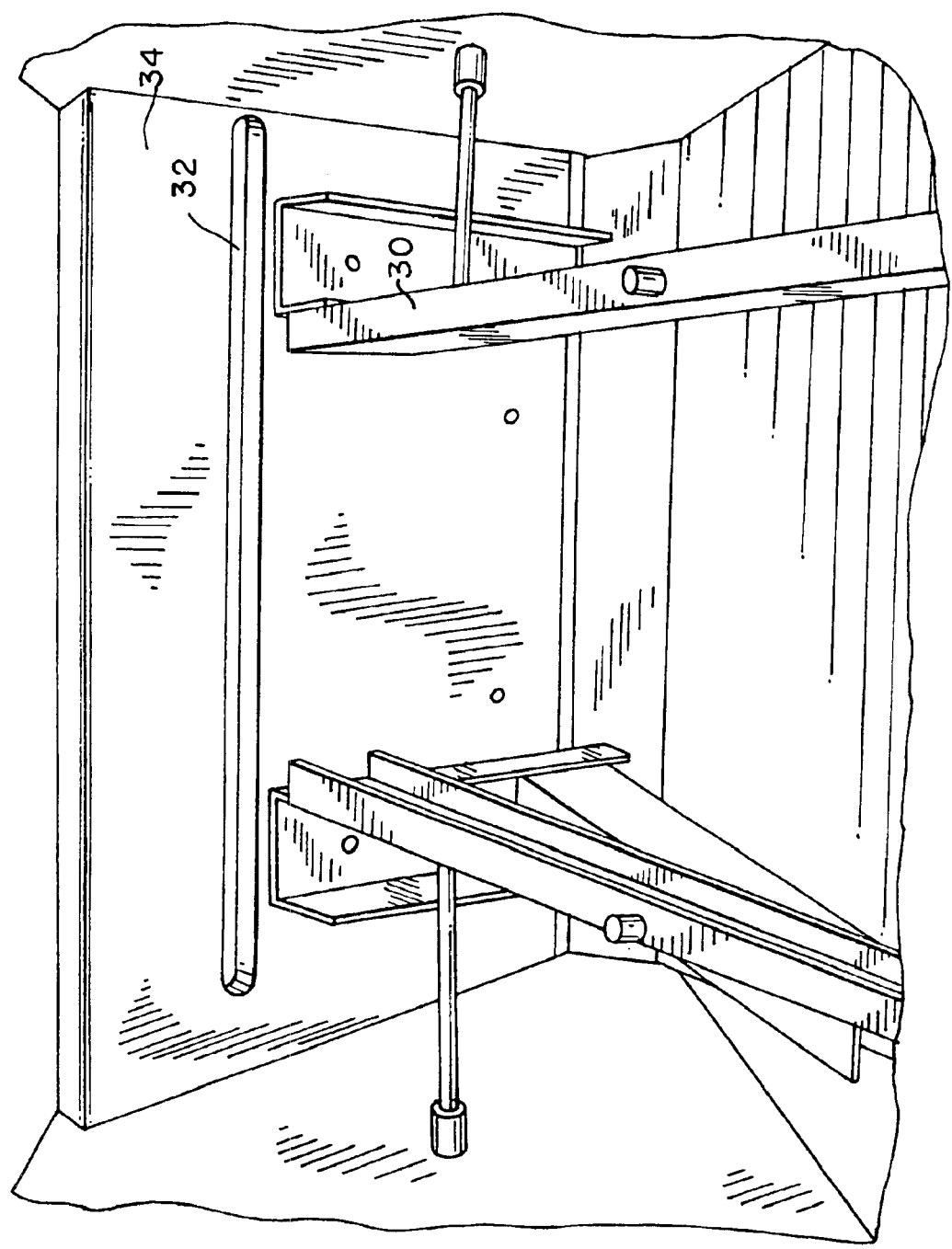
FIG. 7 is a top perspective view of the framework and attaching piece.
Figure 8:
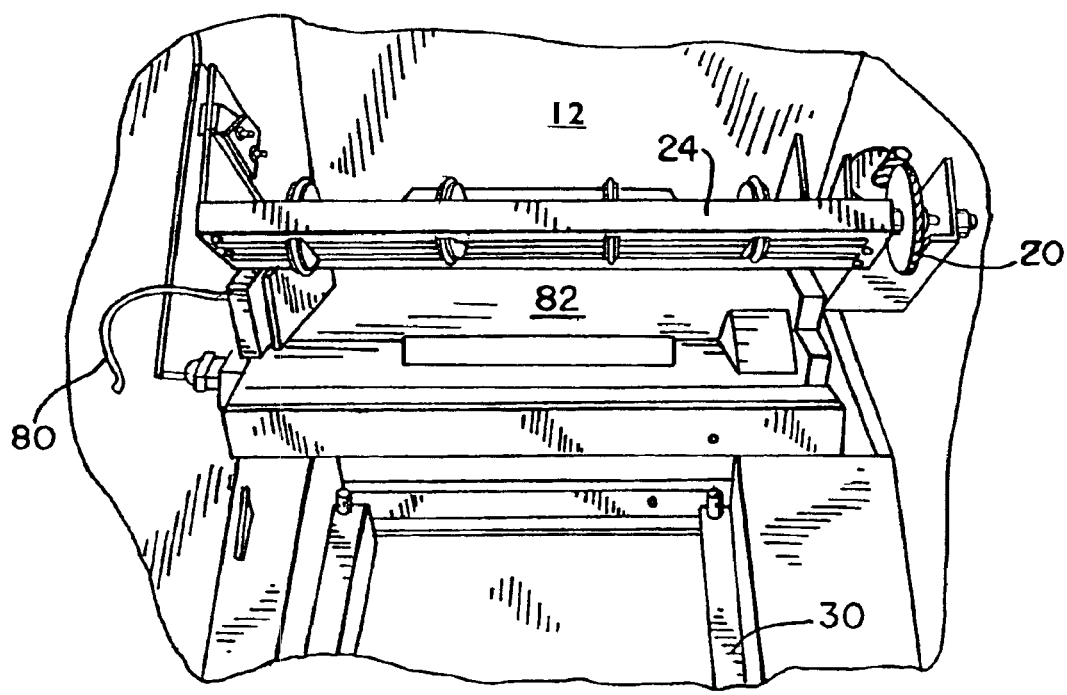
FIG. 8 is a top perspective view of the roller assembly, framework and magazine, wherein the roller assembly is lifter from the magazine.
Figure 9:
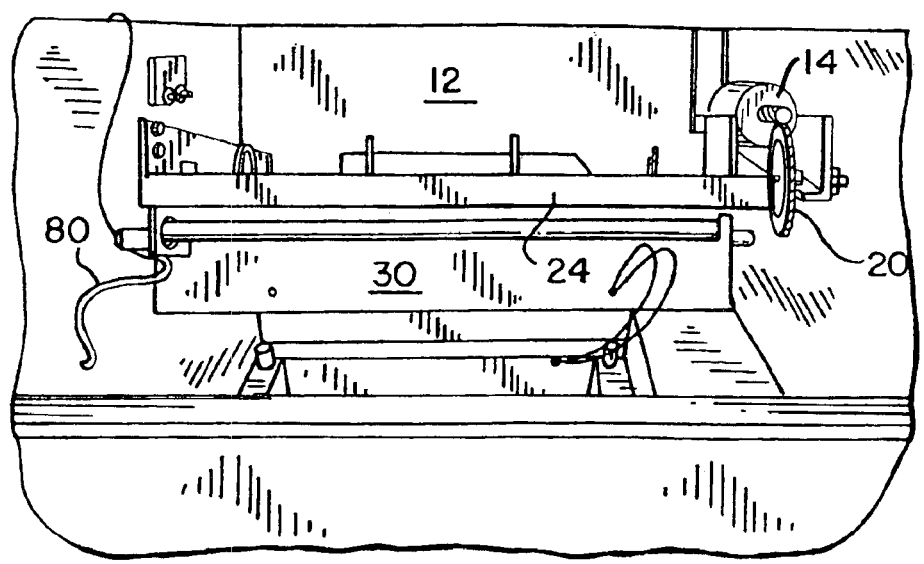
FIG. 9 is a front perspective view of the roller assembly lowered on the magazine with the trip switch on one side.

A shown in FIGS. 7 and 8, magazine 82 is a shallow tray that holds the undeveloped film slides. In the present embodiment, the magazine is made of aluminum. However, the magazine can be made of any material suitable for the purpose of holding undeveloped film slides. Additional undeveloped film slides can be added or existing slides can be removed as needed. Loading and unloading of the slides can be facilitated by raising and lowering the roller assembly. FIG. 8 shown the roller assembly raised, providing access to the magazine. Once loaded, the roller assembly is lowered, as shown in FIGS. 9 and 11. As a result, the magazine functions as a reusable means for feeding slides into the processor. The magazine rests on framework 30 and is placed under the roller assembly, such that the rubber sheaths of the roller wheels contact the uppermost undeveloped film slide. The contact is significant enough so that when the roller assembly spins, the rubber sheaths on the roller wheels facilitate the feeding of the undeveloped film into the x-ray processor. Thus, when the motor is activated by the timer, the slides are fed into the x-ray processor. In other embodiments, the exact number of roller wheels, or the material of the rubber sheaths, can vary within the spirit of the invention.

The magazine feeds the undeveloped slides through a slot 32 of attaching piece 34, as seen in FIG. 7. The attaching piece 34 is located at one end of framework 30 and physically attaches directly onto the back of the x-ray processor with an attaching means, such as thumbscrews. When attached, slot 32 is aligned exactly with a receiving slot of the x-ray processor designed to accept the film slides. Framework 30 slopes downward at an angle, thereby allowing an undeveloped slide to slide down the sloped framework and through the slot. The slope can be any angle that bridges the gap from the magazine to the slot. In the present example, the attaching piece is rectangular shaped and made of wood, but one skilled in the art would understand that the shape and material of the attaching piece could vary widely within the spirit of the invention. Due to its reusability and detachability, the framework, the attaching piece, and, subsequently, the rest of the automatic film feed, can be used with various x-ray processor types and brands.

Figure 10:
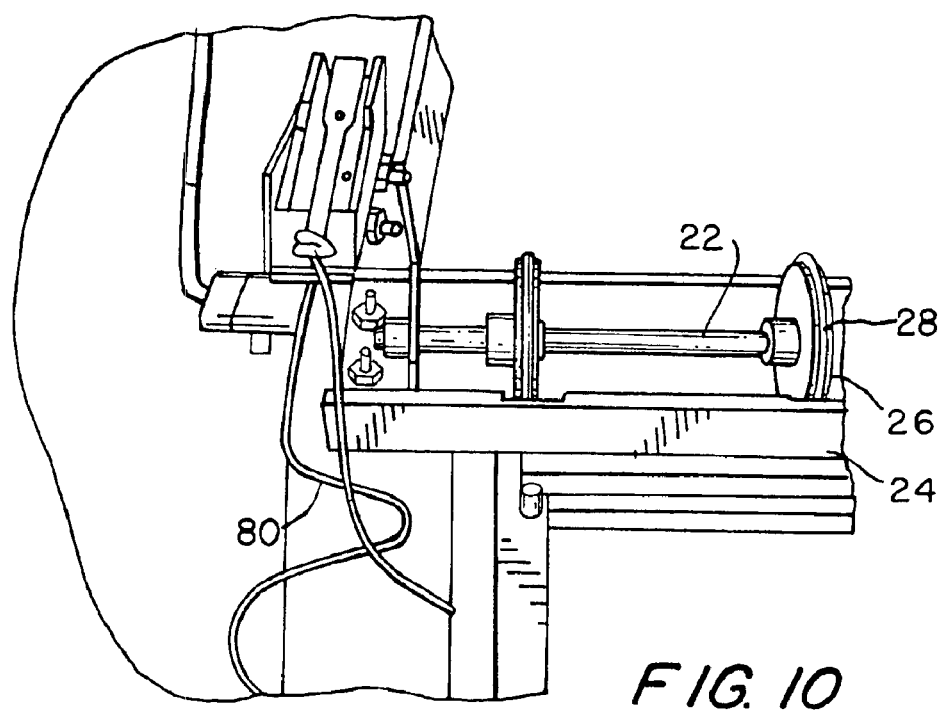
FIG. 10 is a front perspective view of the trip switch beneath the roller assembly.

A trip switch 80 is located between magazine 82 and slot 34 in at a level slightly lower than the magazine, as shown in FIG. 10. The trip switch is operably connected to the relay system, such that, when triggered, the direct current converter will stop converting voltage and the motor will deactivate and stop running. The magazine is positioned such that the front and middle portions of the slide pass over the trip switch as it exits the magazine and roller assembly, but the back end of the slide falls directly onto the trip switch. In this regard, the magazine may be positioned flat or on a slight downward angle. Therefore, when the undeveloped slide fully leaves the magazine, facilitated by the roller assembly, the back of the slide drops from the level of the magazine downward onto the framework to the level of the trip switch. When this happens, the back of the slide triggers the trip switch. Once triggered, the trip switch sends negative feedback through the relay system to the timer, deactivating the converter and the motor. A feeding mechanism of the x-ray processor will continue the advancement of the slide until it is fully inside the processor, whereupon the slide is developed. However, since the motor is deactivated, the next slide will not advance into the processor until the next interval registers in the timer. Thus, when the next interval registers on the timer, the trip switch resets and the converter and motor reactivate, feeding the next slide into the processor.

Enclosure 12 fully encapsulates the undeveloped slides, motor, roller assembly, magazine, framework, attaching piece, trip switch and x-ray processor, thereby protecting the undeveloped slides from light exposure throughout the development process. The enclosure can be made from any number of substances, such as wood, aluminum, sheet metal, or any combination thereof. The exact shape and style of the enclosure can vary as long as it sufficiently covers the various parts housed within while preventing light exposure. The relay system connects to the motor though a hole in the enclosure. The hole is secure so that no light exposure enters the enclosure when the relay system extends through it.

To use the automatic film feed, a user opens enclosure 12, loads the magazine with undeveloped film slides and closes the enclosure. The user then sets the dial to a desired interval time based on the length of time necessary to develop a slide in the x-ray processor. For example, if a slide takes thirty seconds to develop, the user can use the dial to select a forty second interval. Thus, the timer will tell the converter to restart every forty seconds, and, correspondingly, the motor and roller assembly will advance the film into the x-ray processor every forty seconds. The user can then leave the machine unattended until all slides are automatically developed, eliminating the requirement of advancing the film feed manually after each slide develops.

After the user sets the timer to a desired interval, the timer activates the direct current alternator, which converts the power source, for example, energy from a 120 volt outlet, into an direct current voltage necessary start and run the motor. In the present embodiment, the necessary voltage is about 12 volts. The voltage then transmits through the relay system and into the motor, wherein the motor will activate. The motor turns its shaft and corkscrew assembly, thereby engaging the gear roller of the roller assembly such that the roller wheels spin, thereby touching and advancing the first undeveloped slide in the magazine into the x-ray processor.

Upon entry into the x-ray processor, the end of the paper falls down from the processor, hitting a switch that in turn stops the motor. However, when the next interval registers on the timer, the converter is re-activated. The motor re-starts and facilitates movement of the next undeveloped film slide into the X-ray processor.

While the preferred embodiments of the invention have been illustrated and described, it will be appreciated that various changes can be made therein without departing from the spirit and scope of the invention. Although the invention has been described with reference to preferred embodiments, it will be appreciated by one of ordinary skill in the art that numerous modifications are possible in light of the above disclosure. For example, the shape and materials of the control panel's casing and the film feed's enclosure can widely vary. All such variations and modifications are intended to be within the scope and spirit of the invention as defined in the claims appended hereto.

I claim:

1. An automatic film feeder for sequentially advancing a multiplicity of film slides into an x-ray processor apparatus, comprising:
a magazine for holding the multiplicity of film slides positioned adjacent to the x-ray processor;
a roller assembly positioned adjacent to the magazine for advancing a film slide of the multiplicity of film slides into the x-ray processor,
a timer operably related to the roller assembly, wherein the roller assembly advances the film slide into the x-ray processor when the roller assembly is activated by the timer.

2. The film feed of claim 1, wherein the timer is located on a control panel.

3. The film feed of claim 1, further comprising a motor that operably contacts the roller assembly and is activated by the timer.

4. The film feed of claim 3, further comprising a relay system operably connecting the timer to the motor.

5. The film feed of claim 1, further comprising a trip switch between the magazine and the x-ray processor.

6. The film feed according to claim 1, wherein a timed interval is manually imputed on the timer.

7. The film feed according to claim 1, further comprising a framework, wherein the magazine rests upon the framework and the framework is detachable and re-attachable from the x-ray processor.

8. The film feed according to claim 1, further comprising an enclosure, wherein the enclosure surrounds the roller assembly, the magazine and the x-ray processor.

9. The film feed according to claim 8, further comprising a hole in the enclosure, the timer operably connecting to the roller assembly through the hole with a relay system.

10. The film feed according to claim 1, wherein the roller assembly further comprises a gear roller and at least one wheel roller, wherein the at least one wheel roller is adjacent to the magazine.

11. The film feed according to claim 10, further comprising a motor adjacent to the roller assembly.

12. The film feed according to claim 1, the timer further comprising an indicator light.

13. The film feed according to claim 12, wherein the indicator light provides a light indication when the roller assembly is activated.

14. The film feed according to claim 12, wherein the indicator light provides a light indication for when the roller assembly is deactivated.

15. The film feed according to claim 12, wherein the indicator light provides a light indication when all the multiplicity of film slides have entered the x-ray processor.

16. A method for automatically feeding a multiplicity of film slides into a x-ray film processor apparatus for development of the multiplicity of film slides, comprising the steps of:

placing the multiplicity of film slides into a magazine, inputting a time interval on a timer, transmitting a current from the control panel to a roller assembly when the timer registers a first time interval, activating a roller assembly with the current transmitted through the relay system, advancing a first film slide of the multiplicity of film slides into the x-ray film processor through frictional contact of the first film slide with the roller assembly, deactivating the Toiler assembly when the first of the multiplicity of x-ray film slides triggers a trip switch after fully exiting the magazine.

17. The method according to claim 16, further comprising the step of reactivating the roller assembly after a second time interval registers on the timer.

18. The method according to claim 17, further comprising deactivating the roller assembly when a second of the multiplicity of x-ray film slides triggers the trip switch after fully exiting the magazine.

19. The method according to claim 16, wherein the trip switch is located between the magazine and the x-ray processor at a level lower than the multiplicity of film slides, wherein the trip switch is triggered when the first of the multiplicity of x-ray film slides fully exits the magazine and falls onto the trip switch.

20. An apparatus for automatically feeding a multiplicity of x-ray film slides into an x-ray film processor apparatus for development of the slides, comprising:

a timer, a rotatable roller assembly, wherein the roller is activated by the timer a magazine for holding and feeding a multiplicity of undeveloped slides into the x-ray processor positioned adjacent to the roller, a trip switch located between the magazine and the x-ray processor, wherein a slide of the multiplicity of undeveloped film slides exits the magazine at a first level, and wherein the trip switch is at a second level lower than the first level, such that a back of the slide drops from the first level to the second level when the slide fully exits the magazine, triggering the trip switch and deactivating the roller assembly.

* * * * *

UNITED STATES PATENT AND TRADEMARK OFFICE
CERTIFICATE OF CORRECTION

PATENT NO.    : 6,908,237 B2
DATED         : June 21, 2005
INVENTOR(S)   : Gregory J. Bennett It is certified that error appears in the above-identified patent and that said Letters Patent is hereby corrected as shown below:

Column 7,
Line 14, "Toiler" should read -- roller --.

Signed and Sealed this

Twenty-third Day of August, 2005

JON W. DUDAS
*Director of the United States Patent and Trademark Office*